(12) United States Patent
Aioanei

(10) Patent No.: US 10,320,234 B2
(45) Date of Patent: Jun. 11, 2019

(54) MULTIMODE WIRELESS POWER RECEIVERS AND RELATED METHODS

(71) Applicant: Integrated Device Technology, Inc., San Jose, CA (US)

(72) Inventor: Ovidiu Aioanei, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 772 days.

(21) Appl. No.: 13/958,389

(22) Filed: Aug. 2, 2013

(65) Prior Publication Data

US 2015/0035372 A1  Feb. 5, 2015

(51) Int. Cl.
*H02J 7/02* (2016.01)
*H02J 5/00* (2016.01)
*H02J 50/12* (2016.01)
*H02J 50/60* (2016.01)
*H02J 7/00* (2006.01)

(52) U.S. Cl.
CPC .............. *H02J 50/12* (2016.02); *H02J 5/005* (2013.01); *H02J 7/025* (2013.01); *H02J 50/60* (2016.02); *H02J 7/0004* (2013.01)

(58) Field of Classification Search
CPC ............ H02J 7/025; H02J 5/005; H02J 17/00; H02N 2/008; H04B 5/0025–5/0093; B60L 5/005; B60L 11/182; B60L 11/1829–11/1831; Y02T 90/122; H01F 27/006; H01F 27/02; H01F 38/14; H01F 2038/143–2038/146; H01R 13/6633; A61N 1/3787; A61B 1/00029
USPC .......................................... 307/104; 320/108
See application file for complete search history.

(56) References Cited

U.S. PATENT DOCUMENTS

| | | | | |
|---|---|---|---|---|
| 2011/0018360 A1* | 1/2011 | Baarman | ................ | H02J 5/005 307/104 |
| 2011/0140537 A1* | 6/2011 | Takei | ................... | H04B 5/0012 307/104 |
| 2012/0038220 A1* | 2/2012 | Kim | ........................ | H02J 7/025 307/104 |
| 2012/0235636 A1* | 9/2012 | Partovi | ................... | H02J 7/025 320/108 |
| 2013/0062961 A1* | 3/2013 | Park | ...................... | H02J 17/00 307/104 |
| 2014/0139037 A1* | 5/2014 | John | ....................... | H02J 5/005 307/104 |

* cited by examiner

*Primary Examiner* — Rexford N Barnie
*Assistant Examiner* — Thai H Tran
(74) *Attorney, Agent, or Firm* — Haynes and Boone, LLP

(57) ABSTRACT

A wireless power receiver comprises a resonant tank configured to generate an AC power signal responsive to an electromagnetic field, a rectifier configured to receive the AC power signal and generate a DC output power signal, and control logic configured to control the resonant tank to reconfigure and adjust its resonant frequency responsive to a determined transmitter type of a wireless power transmitter. The control logic may operate the wireless power receiver as a multimode receiver having a first mode for a first transmitter type and a second mode for a second transmitter type. The resonant tank may exhibit a different resonant frequency for each of the first mode and the second mode. A method comprises determining a transmitter type for a wireless power transmitter desired to establish a mutual inductance relationship, and adjusting a resonant frequency of a resonant tank of a wireless power receiver.

17 Claims, 5 Drawing Sheets

MULTIMODE WIRELESS POWER RECEIVERS AND RELATED METHODS

FIELD

Embodiments of the present disclosure relate generally to wireless power transfer and, more particularly, to apparatuses and methods related to a multimode wireless power receiver.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled electromagnetic field. In wireless power transmission, power is transferred by transmitting an electromagnetic field through a transmit coil. On the receiver side, a receiver coil may couple with the transmit coil through the electromagnetic field, thus, receiving the transmitted power wirelessly. The distance between the transmitter and receiver coils, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

Wireless power systems are generally intended to operate in a frequency range substantially near (e.g., exactly at) the peak resonance of the resonant tanks of the wireless power devices. Different wireless power devices may be configured differently, which may cause the devices to be incompatible. For example, a wireless power transmitter may be designed to operate according to a peak resonance that is substantially different than the peak resonance of a wireless power receiver. As a result, if one were to attempt to establish wireless power transfer between two dissimilar devices, wireless power transfer parameters such as the system efficiency and the transient response of the wireless power receiver may suffer.

BRIEF SUMMARY

Embodiments of the present disclosure include a wireless power receiver. The wireless power receiver comprises a resonant tank configured to generate an AC power signal responsive to an electromagnetic field, a rectifier configured to receive the AC power signal and generate a DC output power signal, and control logic configured to cause the resonant tank to reconfigure and adjust its resonant frequency responsive to a determined transmitter type of a wireless power transmitter with which a mutual inductance relationship is desired.

Another embodiment of the present disclosure includes a wireless power apparatus. The wireless power apparatus comprises a resonant tank configured to generate an AC power signal responsive to an electromagnetic field, a rectifier configured to receive the AC power signal and generate a DC output power signal, and control logic configured to operate the wireless power receiver as a multimode receiver having a first mode for a first transmitter type and a second mode for a second transmitter type. The resonant tank is configured to exhibit a different resonant frequency for each of the first mode and the second mode.

Another embodiment of the present disclosure includes a method for operating a multimode wireless power receiver. The method comprises determining a transmitter type for a wireless power transmitter desired to establish a mutual inductance relationship, and adjusting a resonant frequency of a resonant tank of a wireless power receiver.

DETAILED DESCRIPTION

Figure 1:
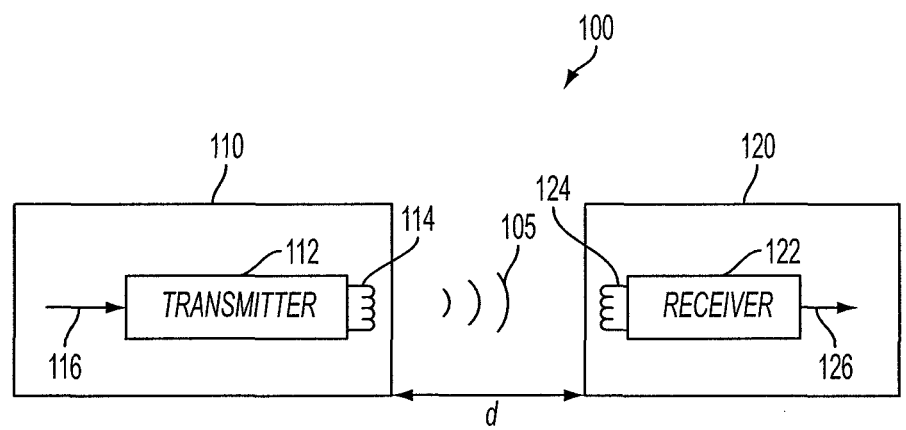
FIG. 1 is a schematic block diagram of a wireless power transfer system according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both non-transitory computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the disclosure may include apparatuses, systems, and methods related to a multimode wireless power receiver. In particular, the multimode wireless power receiver may be configured to reconfigure a resonant tank of the wireless power receiver to adjust the resonant frequency of the wireless power receiver responsive to detecting a transmitter type for a wireless power transmitter.

FIG. 1 is a schematic block diagram of a wireless power transfer system 100 according to an embodiment of the present disclosure. The wireless power transfer system 100 includes a wireless power transmitting apparatus 110, and a wireless power receiving apparatus 120. The wireless power transmitting apparatus 110 includes a wireless power transmitter 112 having a transmit coil 114 configured to generate an electromagnetic field 105 for providing power transfer to the wireless power receiving apparatus 120. The wireless power receiving apparatus 120 includes a wireless power receiver 122 having a receive coil 124 configured to couple with the electromagnetic field 105. The transmit coil 114 and the receive coil 124 may be sized according to the particular devices and applications to be associated therewith. The electromagnetic field 105 may also be referred to as the wireless power signal 105 for power transfer from the wireless power transmitter 112 to the wireless power receiver 122.

An input signal 116 may be provided to the wireless power transmitter 112 for providing the wireless power transmitter 112 with the power for generating the wireless power signal 105 that provides a power transfer to the wireless power receiving apparatus 120. The wireless power receiver 122 may couple to the wireless power signal 105 and generates an output signal 126 in response thereto. The output signal 126 may provide the power that is used by the wireless power receiving apparatus 120 for storing (e.g., charging a battery), consumption (e.g., providing system power), or both.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an efficient power transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and receive coil 124 where this near-field inductive coupling may occur may be referred to as a "coupling region." Because of this mutual inductance relationship, the wireless power transfer may be referred to as inductive wireless power transfer.

The transmit coil 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may include a wireless power transmitter to transmit the wireless power signal 105. The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Embodiments of the present disclosure include the wireless power receiver 122 being configured as a multimode receiver. The wireless power receiver 122 may reconfigure its resonant frequency in response to detecting a different wireless power transmitter type, such as by identifying at least one distinguishing characteristic of a wireless power transmitter that is within a coupling region. For example, there are currently multiple different standards in the wireless power industry. Examples of such standards include the Wireless Power Consortium (WPC) standard, the Power Matters Alliance (PMA) standard, and the Alliance for Wireless Power (A4WP). Each standard may have different characteristics under which they operate. For example, each standard may perform wireless power transfer at different operating frequencies, communicate using different protocols, etc. Reconfiguration of the wireless power receiver 112 to adjust the resonant frequency thereof may result in the wireless power receiver 112 being compatible with each of the above standards or any other wireless power standard or transmitter design. The above-listed standards are to be understood as examples of standards with which at least some embodiments of the disclosure may be configured to operate within. Of course, other standards and transmitter designs are contemplated.

Figure 2:
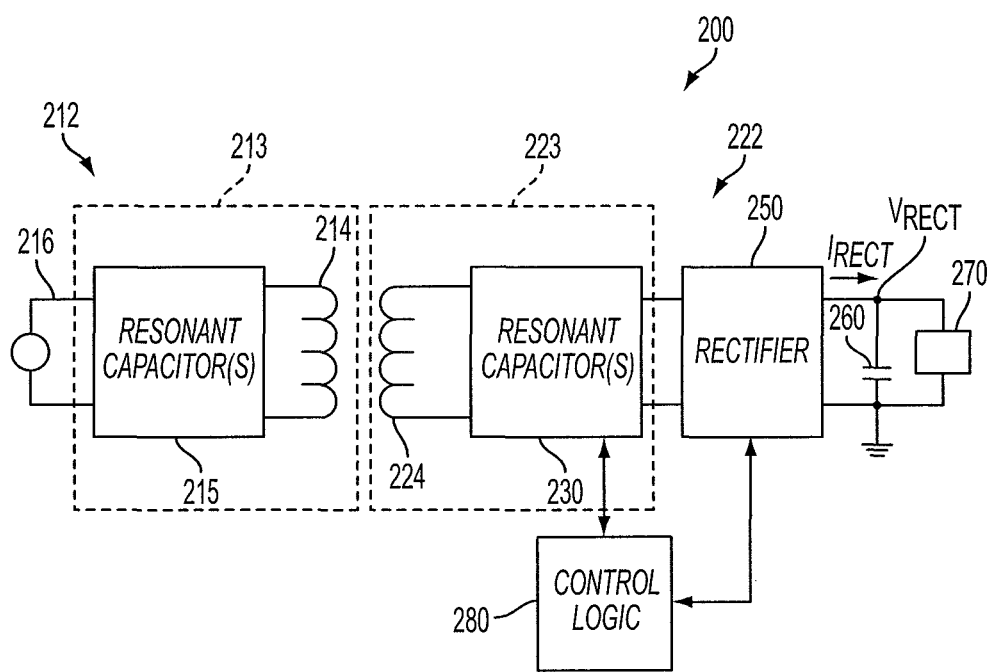
FIG. 2 is a schematic block diagram of a wireless power transfer system according to an embodiment of the present disclosure.

FIG. 2 is a schematic block diagram of a wireless power transfer system 200 according to an embodiment of the present disclosure. The wireless power transfer system 200 includes a wireless power transmitter 212 having resonant tank 213 that includes a transmit coil 214 coupled with resonant capacitors 215. The wireless power receiver 222 includes a resonant tank 223 having a receive coil 224 coupled with resonant capacitors 230. The resonant capacitors 230 are coupled with a rectifier 250. The wireless power transmitter 212 and the wireless power receiver 222 may be incorporated within a wireless power transmitting apparatus 110 (FIG. 1) and a wireless power receiving apparatus 120 (FIG. 1), respectively. The transmit coil 214 and the receive coil 224 (and other components) may be sized according to the particular devices and applications to be associated therewith.

The wireless power transmitter 212 may be configured to generate a wireless power signal 105 (FIG. 1) responsive to an input signal 216 received by the resonant tank 213. The wireless power receiver 222 may be configured to couple with the wireless power signal 150 (which induces an AC current in the receive coil 224) and generate an output power signal (a DC signal) to provide power to a load 270. As a result, the output power signal may include a rectified voltage ($V_{RECT}$) and rectified current ($I_{RECT}$) that is provided to the load 270. The load 270 may include an energy storage device (e.g., battery, such as a lithium-ion battery), system components of a wireless power enabled device, or a combination thereof. Thus, the output signal from the wireless power receiver 222 may be used for charging an energy storage device and/or for providing system power to the various system components of a device.

The wireless power transmitter 212 and wireless power receiver 222 may be generally configured as discussed above with respect to FIG. 1. The configurations of the LC networks within the resonant tanks 213, 223 may generally determine the resonant frequencies of the wireless power transmitter 212 and the wireless power receiver 222, respectively. For example, the resonant frequency of the resonant tanks 213, 223 may be based on the inductance of their respective inductive coil and the capacitance of the plates of the capacitors. The wireless power transmitter 212 and the wireless power receiver 222 may be configured according to a mutual inductance relationship, such that when the resonant frequency of the wireless power receiver 222 and the resonant frequency of the wireless power transmitter 212 are substantially identical, transmission losses between the wireless power transmitter 212 and the wireless power receiver 222 are minimal. As a result, the coupling efficiency and wireless power transfer may be improved. In addition, the frequency of the wireless power signal 105 may be set by the wireless power transmitter 212 at or near the resonant frequencies of the wireless power transmitter 212 and wireless power receiver 222 for minimal transmission losses.

In operation, the input signal 216 may cause an AC current flowing through the resonant tank 213 to generate a time-varying electromagnetic field for transmitting the wireless power signal 105. Thus, the wireless power signal 105 may be a time-varying signal that is substantially sinusoidal, having a frequency that may be based on the switching frequency of the wireless power transmitter 212. In some embodiments, the frequency of the wireless power signal 105 may be set to be approximately the resonant frequency of the resonant tank 213 of the wireless power transmitter 212. In some embodiments, the frequency of the wireless power signal 105 may be set to differ from the resonant frequency of the resonant tank 413, such as to reduce the peak-to-peak current through the transmit coil 214.

In order to receive wireless power signal 105, the wireless power receiver 222 may be placed in the coupling region of the wireless power transmitter 212 such that inductive coupling may be achieved. As a result, the wireless power receiver 222 may receive the wireless power signal 105 and generate an AC power responsive thereto. In order for the power to be used by the load 270, the AC power may be converted to a DC power. The rectifier 250 may generate a rectified voltage ($V_{RECT}$) as well as a rectified current ($I_{RECT}$) flowing through the resonant tank 223. In some embodiments, the rectifier 250 may be configured as a synchronous rectifier. As a result, the rectifier 250 may include one or more switches that are controlled in such a manner to generate the DC output power signal (i.e., rectified voltage ($V_{RECT}$) and rectified current ($I_{RECT}$)). In some embodiments, the rectifier 250 may include one or more diodes configured to generate the DC output power signal.

The wireless power receiver 222 may further include control logic 280 configured to control one or more operations of the wireless power receiver 222. The control logic 280 may be implemented within a processor (e.g., microcontroller) or other circuitry that is configured (e.g., programmed) to perform various operations of embodiments of the present disclosure. The control logic 480 may further include computer-readable media (e.g., memory) storing computing instructions for execution by the processor related to performing processes of the embodiments of the present disclosure. Memory may include volatile and non-volatile memory.

The control logic 280 may be configured as a mode controller to control the wireless power receiver 222 to operate as a multimode receiver responsive to detecting a different type of transmitter, such as by monitoring at least one characteristic of the wireless power transmitter 213 with which a mutual inductance relationship is desired. The control logic 280 may be coupled with the resonant tank 223 to monitor signals within the resonant tank to identify distinguishing characteristics of the transmitter types. The control logic 280 may also couple with the resonant tank 223 to control the reconfiguration of the resonant tank 223 and adjust the resonant frequency thereof.

In addition, the control logic 280 may be operably coupled with the rectifier 250 to control the operation thereof. For example, if the rectifier 250 is a synchronous rectifier, the control logic 280 may generate the control signals for operation thereof. The control logic 280 may further control other functions of the wireless power receiver 222, such as controls related to modulation/demodulation, foreign object detection, device operation, etc. The control logic 280 may include different sub-blocks that perform one or more of the above functions separately rather than by employing within a single process, routine, program, etc. In addition, the control logic 280 may employ different hardware elements for different functions.

It should be recognized that the devices of a wireless power transfer system 200 may include additional components to perform other features not specifically described herein or shown in the various figures. For example, wireless power enabled devices may include a modulator and/or a demodulator for communicating with other devices, foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

Figure 3:
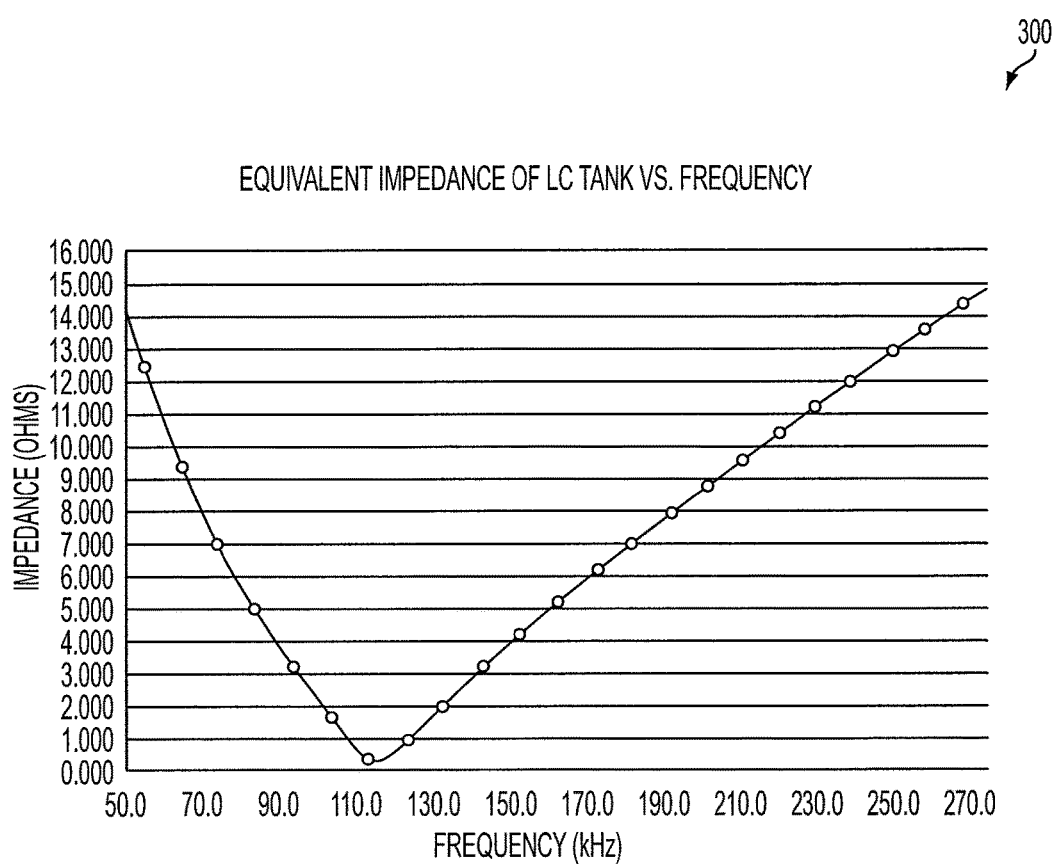
FIG. 3 is a plot showing the equivalent impedance of a resonant tank as the operating frequency of the wireless power transmitter moves away from the peak resonance of the wireless power receiver.

FIG. 3 is a plot 300 showing the equivalent impedance of a resonant tank as the operating frequency of the wireless power transmitter moves away from the peak resonance of the wireless power receiver. In particular, in this example, the peak resonance of the wireless power receiver is about 110 kHz, which is presently the intended operating frequency for the WPC standard. The plot 300 shows that the equivalent impedance of the resonant tank increases as the operating frequency moves away from the peak resonance of the wireless power transmitter. As a result, if a wireless power transmitter having a different operating frequency is desired to enter into a mutual inductance relationship and transfer wireless power, the equivalent impedance of the resonant tank of the wireless power receiver will be relatively higher than if the wireless power transmitter's operating frequency were approximately the peak resonance of the wireless power receiver.

As a further example, if the peak resonance of the wireless power receiver is about 110 kHz (e.g., WPC standard), but the operating frequency of the wireless power transmitter is a different frequency (e.g., between 225 kHz and 278 kHz—present PMA standard), the equivalent impedance of the resonant tank may increase. As a result, the efficiency of the system and the transient response of the rectified voltage (VRECT) may be negatively affected.

Embodiments of the present disclosure, however, include the wireless power receiver detecting a wireless power transmitter type and reconfiguring the resonant tank exhibit a different resonant frequency that is closer to (e.g., approximately equal to) the operating frequency of the wireless power transmitter. Detecting the wireless power transmitter type may include detecting at least one unique characteristic of the wireless power transmitter type.

Figure 4:
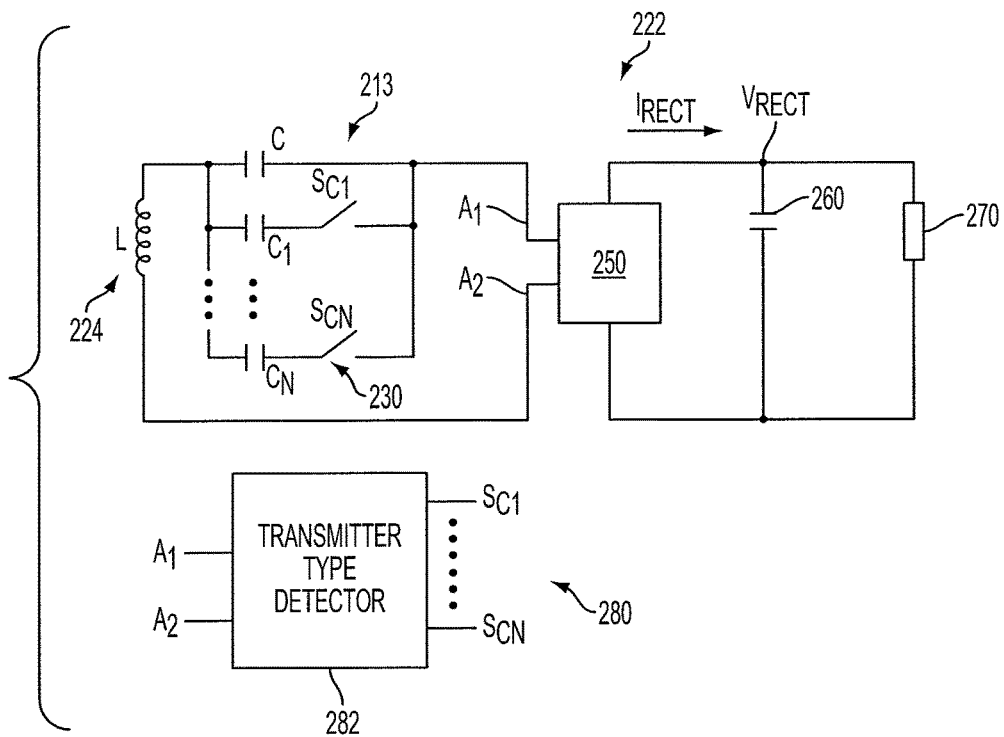
FIGS. 4-7 are wireless power receivers according embodiments of the present disclosure.

FIG. 4 is a wireless power receiver 222 according to an embodiment of the present disclosure. As discussed above, the wireless power receiver 222 may include a resonant tank 230 operably coupled with a rectifier 250 to provide a rectified voltage ($V_{RECT}$) to the load 270. The wireless power receiver 222 may further include control logic 280 that is configured to control the operation of the wireless power receiver 222 as a multimode receiver. The control logic 280 may include a transmitter type detector 282 that is configured to determine a transmitter type and control the reconfiguration of the resonant tank 213 in response thereto.

As shown in FIG. 4, the resonant tank 213 may include a transmit coil 224 coupled with resonant capacitors 230. The resonant capacitors 230 include a plurality of capacitors C, $C_1, \ldots C_N$ coupled with the receive coil 224. The plurality of capacitors C, $C_1, \ldots C_N$ are coupled in parallel with each other. At least some of the capacitors $C_1 \ldots C_N$ are coupled with a switch $S_{C1} \ldots S_{CN}$, respectively. The switches $S_{C1} \ldots S_{CN}$ are controlled (e.g., enabled, disabled) by the control logic 280, for example, by the transmitter type detector 282. The transmitter type detector 282 may generate the control signals that enable the switches $S_{C1} \ldots S_{CN}$ to add capacitance to the resonant tank 223 by enabling one or more of the parallel paths that include the capacitors $C_1 \ldots C_N$ and the switches $S_{C1} \ldots S_{CN}$. As a result, the control logic 280 may reconfigure the resonant tank 223 to adjust the resonance of the resonant tank 223 in response to determining the transmitter type of the wireless power transmitter with which establishing wireless power transfer is desired.

Determining the transmitter type may include detecting at least one characteristic of the wireless power transmitter that is unique to a particular transmitter type. For example, such characteristics may include an operating frequency, a unique ping structure, a unique ping sequence, a communication protocol, or other distinguishing feature. As to between different wireless standards, such characteristics may be unique to a particular wireless power standard. For example, the transmitter type detector 282 may receive an input that assists in the determination of transistor type, and generate the appropriate control signals to the switches $S_{C1} \ldots S_{C2}$ to adjust the capacitance of the resonant tank 223. The switches $S_{C1} \ldots S_{CN}$ that are enabled depends on the transmitter type (particularly its known operating frequency)

such that the capacitors $C_1 \ldots C_N$ that are added result in the resonant tank 223 having a resonant frequency that is closer to the operating frequency than it was prior to reconfiguration.

As an example, a wireless power transmitter 212 and a wireless power receiver 222 may be placed within the general vicinity of each other. The wireless power transmitter 212 may detect the presence of the wireless power receiver 222, and transmit a digital ping to the wireless power receiver 222 in order to establish communication and eventually wireless power transfer. The wireless power receiver 222 may receive the digital ping signal from the wireless power transmitter 212. Different wireless power standards may have different digital ping characteristics. As a result, the transmitter type detector 282 may receive at least one input, which as shown in FIG. 4 are the analog inputs $A_1$, $A_2$ to the rectifier 250. The transmitter type detector 282 may monitor the analog inputs $A_1$, $A_2$ and recognize a unique characteristic of the ping signal, such as the frequency of the ping signal. Some transistor types may send a ping signal that has a constant frequency, while others may have a ping signal that has sweeps across a range of frequencies.

Another unique characteristic may be in the communication protocol used (e.g., coding/decoding scheme). Such an approach may result in the wireless power receiver 222 transmitting a message to the wireless power transmitter 212 using a first encoding scheme and waiting for a response. If no response is receive, a second message may be sent using a second encoding scheme and waiting for a response. Whichever encoding scheme resulted in a response may be used to determine the transmitter type. In some embodiments, the input to the transmitter type detector 282 may be the rectified voltage ($V_{RECT}$), which may result in different values depending on the transmitter type.

In some embodiments, the input to the transmitter type detector 282 may be manually-driven rather than automatically. For example, the user input may indicate which type of transmitter type a particular transmitter is. Non-limiting examples of such a user input includes the user pressing a button, flipping a manual switch, pressing a selection on a touch screen, or other similar input that may be implemented in hardware and/or software.

Once transmitter type is determined, the desired resonant frequency for the resonant tank 223 may be determined to be relatively closer to the operating frequency of that transmitter type than before. The wireless power receiver 222 may then configure the resonant tank 213 to have a resonant frequency that more closely matches the operating frequency of the particular wireless power transmitter 212 that is desired to engage with for wireless power transfer. Reconfiguration of the resonant tank 213 may include enabling one or more switches SC1 . . . SCN that are coupled to the capacitors C1 . . . CN to adjust the capacitance to the resonant tank 231. In some embodiments the adjusted resonant frequency for the reconfigured resonant tank 223 may be substantially the same as the operating frequency of the wireless power transmitter 212.

In addition to reconfiguring the resonant tank 223, other features of the wireless power receiver 222 may be reconfigured for a given transmitter type. For example, the modulation/demodulation schemes of the wireless power receiver 222 may be changed to match those of the transmitter type.

Figure 5:
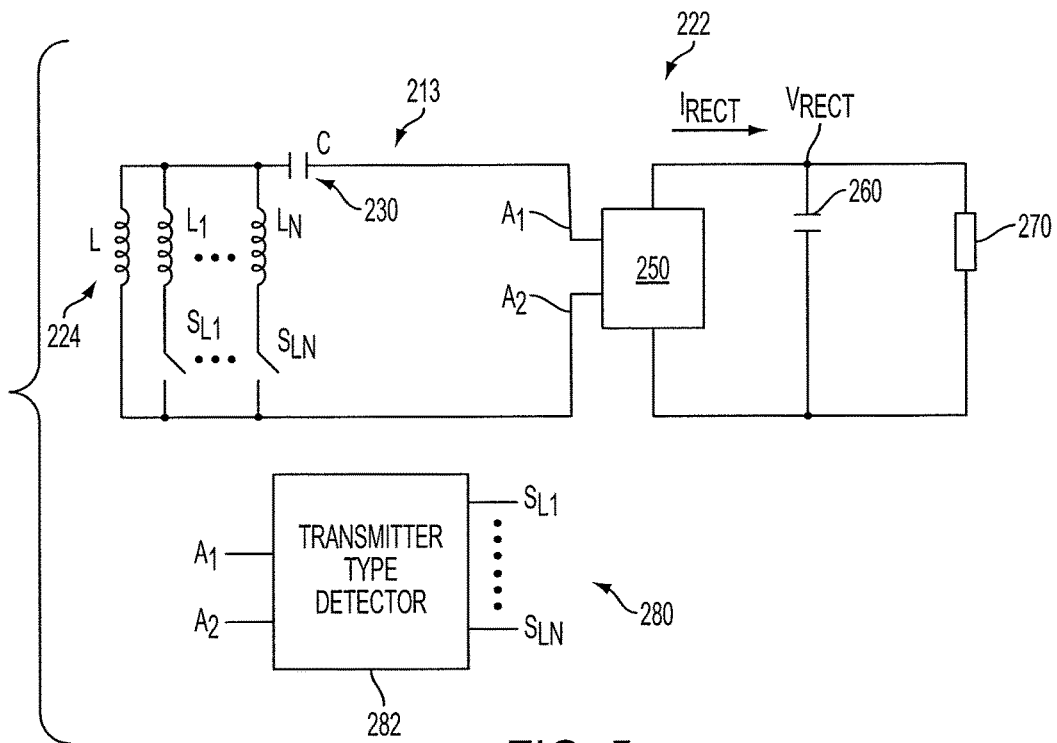

FIG. 5 is a wireless power receiver 222 according to another embodiment of the present disclosure. The wireless power receiver 222 is configured similarly to that of FIG. 4 with the exception that the resonant tank 223 and the control logic 280 are configured such that the inductance of the resonant tank 223 may be adjusted as opposed to the capacitance. In FIG. 5, the resonant tank 223 may include the receive coil 224 including a plurality of inductors L, $L_1$, . . . $L_N$ coupled in series with the resonant capacitor 230. The plurality of inductors L, $L_1$, . . . $L_N$ may be coupled parallel to each other. At least some of the inductors $L_1$ . . . $L_N$ are coupled with a switch $S_{L1}$ . . . $S_{LN}$, respectively. The switches $S_{L1}$ . . . $S_{LN}$ are controlled (e.g., enabled, disabled) by the control logic 280, for example, by the transmitter type detector 282. The transmitter type detector 282 generates the control signals that enable the switches $S_{L1}$ . . . $S_{LN}$ to add inductance to the resonant tank 223 by enabling one or more of the parallel paths that include the inductors $L_1$ . . . $L_N$ and the switches $S_{L1}$ . . . $S_{LN}$. As a result, the control logic 280 reconfigures the resonant tank 223 to adjust the resonance of the resonant tank 223 in response to determining a transmitter type of the wireless power transmitter 212.

Figure 6:
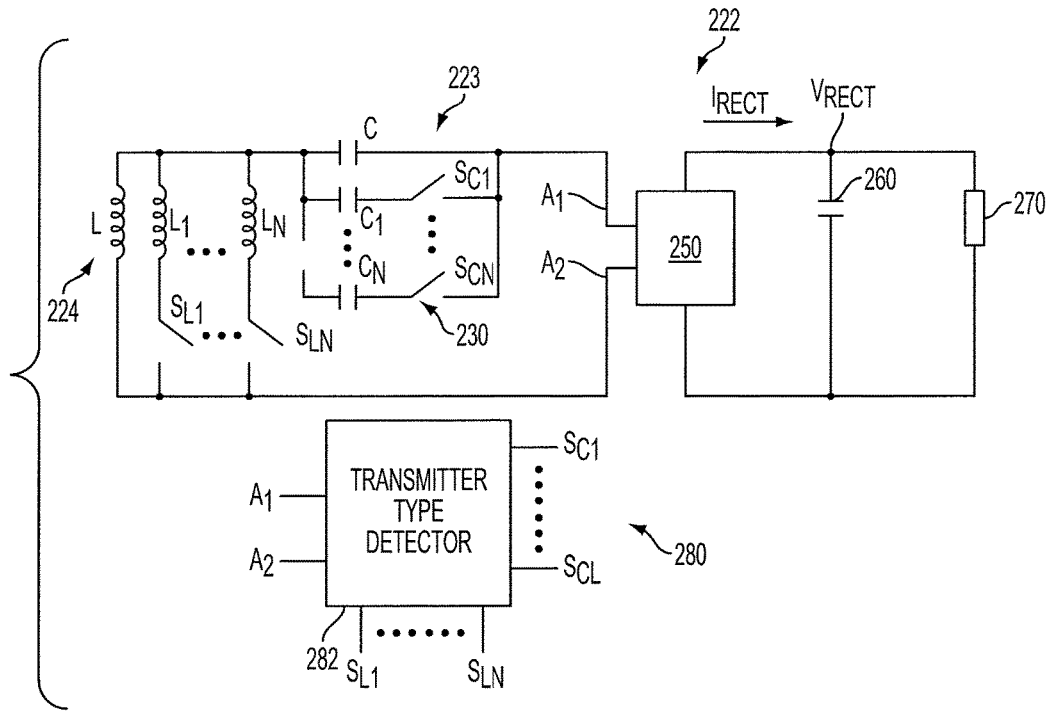

FIG. 6 is a wireless power receiver 222 according to another embodiment of the present disclosure. The wireless power receiver 222 is configured similarly to that of FIGS. 4 and 5 with the exception that the resonant tank 223 and the control logic 280 are configured such that both the capacitance and the inductance of the resonant tank 223 may be adjusted as opposed to one of them being a fixed value. In FIG. 5, the resonant tank 223 may include the receive coil 224 including a plurality of inductors L, $L_1$, . . . $L_N$ coupled in series with the resonant capacitor 230, which includes a plurality of capacitors C, $C_1$, . . . $C_N$. The plurality of inductors L, $L_1$, . . . $L_N$ may be coupled parallel to each other. At least some of the inductors $L_1$ . . . $L_N$ are coupled with a switch $S_{L1}$ . . . $S_{LN}$, respectively. The switches $S_{L1}$ . . . $S_{LN}$ are controlled (e.g., enabled, disabled) by the control logic 280, for example, by the transmitter type detector 282. The transmitter type detector 282 generates the control signals that enable the switches $S_{L1}$ . . . $S_{LN}$ to add inductance to the resonant tank 223. The plurality of capacitors C, $C_1$, . . . $C_N$ are coupled in parallel with each other. At least some of the capacitors $C_1$ . . . $C_N$ are coupled with a switch $S_{C1}$ . . . $S_{CN}$, respectively. The switches $S_{C1}$ . . . $S_{CN}$ are controlled (e.g., enabled, disabled) by the control logic 280, for example, by the transmitter type detector 282. The transmitter type detector 282 may generate the control signals that enable the switches $S_{C1}$ . . . $S_{CN}$ to add capacitance to the resonant tank 223 by enabling one or more of the parallel paths that include the capacitors $C_1$ . . . $C_N$ and the switches $S_{C1}$ . . . $S_{CN}$. As a result, the control logic 280 may reconfigure the resonant tank 223 to adjust the resonance of the resonant tank 223 (by adjusting the capacitance, the inductance, or both) in response to determining the transmitter type of the wireless power transmitter with which establishing wireless power transfer is desired. As a result, the control logic 280 reconfigures the resonant tank 223 to adjust the resonance of the resonant tank 223 in response to determining a transmitter type of the wireless power transmitter 212.

Figure 7:
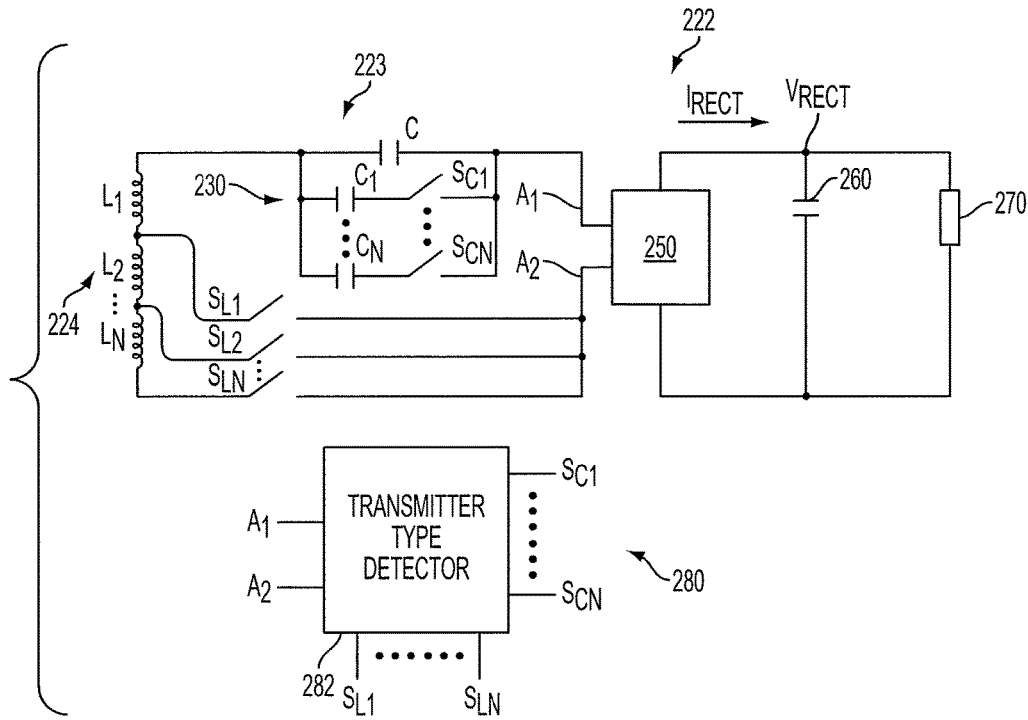

FIG. 7 is a wireless power receiver 222 according to another embodiment of the present disclosure. The wireless power receiver 222 is configured similarly to that of FIG. 6 in that both the capacitance and the inductance of the resonant tank 213 may be adjusted. In FIG. 7, however, the inductors $L_1$, $L_2$, . . . $L_N$ are coupled in series with a switch path coupled at each node therebetween. At least some of the inductors $L_1$ . . . $L_N$ are coupled with a switch $S_{L1}$ . . . $S_{LN}$, respectively. The switches $S_{L1}$ . . . $S_{LN}$ are controlled (e.g., enabled, disabled) by the control logic 280, for example, by the transmitter type detector 282. In some embodiments, the inductors $L_1 \ldots L_N$ may be discrete inductors having defined nodes therebetween, while some embodiments may include the switches $S_{L1} \ldots S_{LN}$ being coupled at tap locations that are intermediate locations between terminals of an individual coil. While this configuration of inductors $L_1$, $L_2, \ldots L_N$ is shown in FIG. 7 with an adjustable capacitor network, this configuration of inductors $L_1, L_2, \ldots L_N$ in series may be coupled with a capacitor network that is fixed in value.

Thus, FIGS. 4-7 describe wireless power receivers 222 may include resonant tanks 213 having a fixed impedance and an adjustable capacitance (e.g., FIG. 4), an adjustable impedance and a fixed capacitance (e.g., FIG. 5), and both an adjustable impedance and an adjustable capacitance (e.g., FIGS. 6, 7). Although specific configurations of capacitors and inductors are described and shown herein. Other configurations are contemplated as being within the scope of disclosure so long as the resonant tank may be reconfigured to adjust the resonant frequency.

Figure 8:
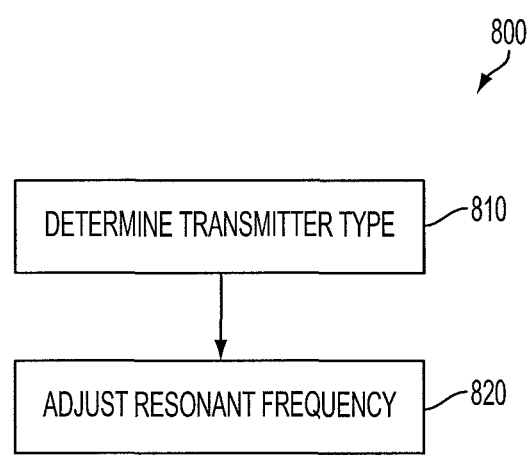
FIG. 8 is a flowchart illustrating a method for operating a multimode wireless power receiver according to an embodiment of the present disclosure.

FIG. 8 is a flowchart 800 illustrating a method for operating a multimode wireless power receiver according to an embodiment of the present disclosure. At operation 810, a transmitter type for a wireless power transmitter may be determined. Determining the transmitter type may be responsive to receiving a digital ping signal from the wireless power transmitter located within a range for wireless power transfer. The digital ping structure may be detected and at least one unique characteristic (e.g., frequency, ping structure, protocol, etc.) may be determined as being associated with a particular transistor type. In some embodiments, the transmitter type may be a user input (e.g., physical switch, selection in software, etc.) such that the user may indicate which transmitter type is desired, and therefore in which mode the wireless power receiver should be configured to operate.

At operation 820, the resonant frequency of a resonant tank of a wireless power receiver may be adjusted. Adjusting the resonant frequency of the resonant tank may include at least one of adjusting a capacitance of the resonant tank while maintaining a fixed inductance, adjusting an inductance of the resonant tank while maintaining a fixed capacitance, and adjusting both a capacitance an inductance of the resonant tank. Maintaining a fixed inductance and/or capacitance may include hardware that has either a fixed inductance or a fixed capacitance (of course the other of the inductance or capacitance would be adjustable, as in FIGS. 4 and 5). In some embodiments (e.g., FIGS. 6 and 7), both the inductance and capacitance may be adjustable; however, even in such embodiments either a fixed inductance or a fixed capacitance may be maintained simply by adjusting only one of the two even though both may be adjusted. Adjusting the resonant frequency may include reconfiguring the resonant tank during a first mode to have a first resonant frequency associated with a first transmitter type, and reconfiguring the resonant tank during a second mode to have a second resonant frequency associated with a second transmitter type. Any number of modes for reconfiguring the resonant tank are contemplated, which may correspond to the number of transmitter types recognized by the system. Some transmitter types may have more than one mode associated therewith, such that the resonant tank may be configured differently for a particular transmitter type depending on other circumstances or factors.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power receiver, comprising:
   a resonant tank configured to generate an AC power signal responsive to an electromagnetic field transmitted by a wireless power transmitter;
   a rectifier configured to receive the AC power signal and generate a DC output power signal; and
   control logic configured to:
      transmit a first message using a first encoding scheme to the wireless power transmitter;
      in response to the wireless power receiver not receiving a first response to the first message, transmit a second message using a second encoding scheme to the wireless power transmitter;
      receive a second response to the second message from the wireless power transmitter;
      determine a type of the wireless power transmitter based on having received the second response to the second message using the second encoding scheme and using a wireless power transmitter type detector that is configured to determine the type of the wireless power transmitter responsive to an input of the rectifier and the DC output power signal;
      adjust one or more control signals of the rectifier based on the determined type of the wireless power transmitter; and
      cause the resonant tank to reconfigure and adjust a resonant frequency of the resonant tank to match an operating frequency of the wireless power transmitter based on the determined type of the wireless power transmitter.

2. The wireless power receiver of claim 1, wherein the resonant tank includes a plurality of capacitors that are controllable by one or more switches to adjust capacitance of the resonant tank.

3. The wireless power receiver of claim 2, wherein the plurality of capacitors are coupled in parallel with each other, wherein at least one parallel path includes the at least one of the one or more switches.

4. The wireless power receiver of claim 1, wherein the resonant tank includes a plurality of inductors that are controllable by one or more switches to adjust inductance of the resonant tank.

5. The wireless power receiver of claim 4, wherein the plurality of inductors are coupled in parallel with each other, wherein at least one parallel path includes the at least one of the one or more switches.

6. The wireless power receiver of claim 4, wherein the plurality of inductors are coupled in series with each other, wherein the at least one of the one or more switches is coupled at a node between inductors and is coupled with the rectifier.

7. The wireless power receiver of claim 1, wherein the resonant tank includes a plurality of inductors and a plurality of capacitors that are controllable by one or more switches to adjust both capacitance and inductance of the resonant tank.

8. The wireless power receiver of claim 1, wherein the determined type of the wireless power transmitter is based, at least in part, on a unique characteristic of a wireless power standard.

9. The wireless power receiver of claim 8, wherein the unique characteristic includes at least one of an operating frequency, a digital ping structure, and a communication protocol.

10. A wireless power apparatus, comprising:
    a resonant tank configured to generate an AC power signal responsive to an electromagnetic field transmitted by a wireless power transmitter;
    a rectifier configured to receive the AC power signal and generate a DC output power signal; and
    control logic configured to:
        send one or more messages to the wireless power transmitter, each message of the one or more messages being encoded using a different encoding scheme;
        receive a response to a first one of the one or more messages from the wireless power transmitter;
        determine a type of the wireless power transmitter based on the respective encoding scheme used by the first one of the one or more messages for which the response was received and using a wireless power transmitter type detector that is configured to determine the type of the wireless power transmitter responsive to an input of the rectifier and the DC output power signal;
        operate the wireless power apparatus as a multimode receiver having a first mode for a first transmitter wireless power type and a second mode for a second wireless power transmitter type;
        select a mode associated with the determined type of the wireless power transmitter;
        adjust one or more control signals of the rectifier based on the selected mode; and
        cause the resonant tank to reconfigure and adjust a resonant frequency of the resonant tank to match an operating frequency of the wireless power transmitter based on the selected mode;
    wherein the resonant tank is configured to exhibit a different resonant frequency for each of the first mode and the second mode.

11. The wireless power apparatus of claim 10, wherein the wireless power transmitter type detector is further responsive to a user input indicating the type of the wireless power transmitter.

12. The wireless power apparatus of claim 10, wherein the wireless power apparatus is a wireless power receiver.

13. The wireless power apparatus of claim 10, wherein the wireless power apparatus is an electronic device that includes a wireless power receiver, the wireless power receiver including the resonant tank, the rectifier, and the control logic.

14. A method for operating a multimode wireless power receiver, the method comprising:
    detecting, by a wireless power receiver, a ping signal from a wireless power transmitter at a first frequency;
    determining, by control logic of the wireless power receiver, a wireless power transmitter type for a wireless power transmitter based on the first frequency of the detected ping signal and using a wireless power transmitter type detector that is configured to determine the wireless power transmitter type responsive to an input of a rectifier of the wireless power receiver and a DC output power signal of the wireless power receiver;
    adjusting one or more control signals of the rectifier of the wireless power receiver based on the determined type of the wireless power transmitter; and
    adjusting a resonant frequency of a resonant tank of the wireless power receiver to match an operating frequency of the wireless power transmitter based on the type of the wireless power transmitter.

15. The method of claim 14, wherein adjusting the resonant frequency of the resonant tank includes at least one of:
    adjusting a capacitance of the resonant tank while maintaining a fixed inductance;
    adjusting an inductance of the resonant tank while maintaining a fixed capacitance; and
    adjusting both a capacitance and an inductance of the resonant tank.

16. The method of claim 14, wherein adjusting the resonant frequency further includes:
    reconfiguring the resonant tank during a first mode to have a first resonant frequency associated with a first wireless power transmitter type; and
    reconfiguring the resonant tank during a second mode to have a second resonant frequency associated with a second wireless power transmitter type.

17. The method of claim 14, further comprising changing a modulation scheme based on the determined type of the wireless power transmitter.

* * * * *